2,807,641

SULPHONATION OF BENZENE

David William Milner and Ernest Clifford Holdsworth, Cleckheaton, England, assignors to The Vulcan Chemical Company Limited, Cleckheaton, England No Drawing. Application August 20, 1953, Serial No. 375,550

Claims priority, application Great Britain October 7, 1952

7 Claims. (Cl. 260—505)

This invention relates both to the monosulphonation and also to the disulphonation of benzene by reaction with sulphur trioxide and to the absorption of sulphur trioxide from the mixtures with oxygen and/or nitrogen, in particular from gas issuing from the converters of pyrites or sulphur-burning sulphuric acid plants.

The usual methods of sulphonating benzene are to contact benzene or its vapour with concentrated sulphuric acid or with oleum with suitable cooling of the reaction mixture. These methods leave an excess of sulphuric acid in the product which requires removal before the benzene sulphonic acid or its salts can be employed, for example, for the manufacture of phenol by alkali fusion.

The value of using sulphur trioxide instead of sulphuric acid or oleum for sulphonating benzene has long been recognised but if sulphur trioxide is used alone large amounts of diphenyl sulphone are formed simultaneously. In consequence methods of diluting the sulphur trioxide in inert solvents such as chloroform and liquid sulphur dioxide have been evolved. Unfortunately the use of such solvents leads to additional problems, especially of solvent recovery.

We have found that an excellent solvent for sulphur trioxide is benzene sulphonic acid itself and a feature of our invention is to allow benzene sulphonic acid to absorb sulphur trioxide and then introduce benzene into the mixture so that benzene sulphonic acid alone is the product. Alternatively by suitable heat treatment of the solution of sulphur trioxide in benzene sulphonic acid, the mixture can be converted to benzene disulphonic acid. Benzene disulphonic acid is the essential intermediate for the manufacture of resorcinol.

The form in which the sulphur trioxide is introduced to the benzene sulphonic acid may be as the pure substance but it is a feature of our invention that liquid benzene sulphonic acid will effectively remove sulphur trioxide vapour from its admixture with an inert gas. Thus, the gas issuing from the converters of a pyrites or sulphur-burning sulphuric acid plant contains about seven percent by volume of sulphur trioxide and the benzene sulphonic acid is remarkably efficient in scrubbing out the sulphur trioxide from this gas. It can be seen that if this mode of operation is employed there is a considerable economy of time and effort since the normal absorbing system of the acid plant in which oleum or concentrated sulphuric acid is made prior to sulphonating benzene, is by-passed.

In describing the method by which the aforesaid process can be worked we take first the case where it is desired to make only benzene monosulphonic acid. Benzene sulphonic acid is circulated through an absorption column countercurrent to the converter gas (which contains about 7% $SO_3$ and the rest mainly oxygen and nitrogen). Concurrent flow of the benzene sulphonic acid and the gas containing trioxide may also be the manner of operation since the absorption of sulphur trioxide by the benzene sulphonic acid is very rapid. The temperatures of the incoming flows of benzene sulphonic acid and gas are maintained by suitable cooling at as low a figure as is consistent with keeping the benzene sulphonic acid in a liquid state. These temperatures are within the range of 61° C. to 100° C. when the liquid phase is benzene sulphonic alone, or 48° C. to 100° C. where the addition of salts, such as is described later, has been made. It is generally preferred to use a temperature not exceeding 80° C.

After being scrubbed, the gas can be vented to a further absorption system to recover residual traces of sulphur trioxide, sulphur dioxide, benzene, diphenyl sulphone etc. or if the quantities of these contaminants are below an economic or statutory significance, the gas can be discharged to the atmosphere.

The liquid issuing from the base of the absorption column is run into an excess of dry benzene in a vessel fitted with an agitator and with cooling devices to remove the heat of sulphonation. After all the sulphur trioxide contained in the benzene sulphonic acid has been converted to benzene sulphonic acid, the latter is then run into another and similar vessel where the stoichiometric amount of sulphur trioxide (contained in benzene sulphonic acid and derived from the absorption tower) is added. This second part of the process is to ensure that any benzene dissolved in the benzene sulphonic acid is sulphonated.

Alternatively, the stoichiometric amount of benzene may be added to the reactants in the first-mentioned vessel, either alone or in the form of a solution in benzene sulphonic acid. Here again suitable cooling to remove the heat of sulphonation is provided by means of cooling coils.

The product is then divided into two streams. One is recirculated to the absorption tower and the other to storage. It is obvious that the excess of benzene sulphonic acid over the amount in circulation is the product, and this quantity will be proportional to the amount of sulphur trioxide absorbed in the absorption column.

We have found that at low temperatures, i. e. below 80° C. the disulphonation of benzene is slow and this allows the sulphur trioxide to react with the benzene before it has had sufficient opportunity to sulphonate the benzene sulphonic acid to any substantial degree.

In the case where benzene disulphonic acid is required as the end product, benzene monosulphonic acid may be allowed, in the absorption system, to dissolve the stoichiometric amount of sulphur trioxide required for its disulphonation. The resulting mixture of benzene sulphonic acid and sulphur trioxide is then gradually heated up to 180° to complete the disulphonation. This heating process may take up to 20 hours, but can usually be carried out in 2 hours.

It may be explained that the minimum heating period for efficient disulphonation when sulphuric acid is absent is 2 hours at 180° C. but in the presence of sulphuric acid, the heating has to be prolonged. Small amounts of sulphuric acid may be formed by the reaction of sulphur trioxide with traces of moisture which may unavoidably enter the system.

The temperature of the converter gas leaving the converters of an acid plant is reduced by heat-exchangers to about 250° C. The normal practice is then to cool this gas further by passage through air cooled pipes. However, this gas can be used to heat the apparatus in which the disulphonation is being carried out, or alternatively the gas can be used directly to heat and sulphonate the benzene sulphonic acid by passing the gas through the acid itself. In this manner, it is not necessary to provide external heating for the disulphonation reaction and a considerable saving is thereby effected.

If the converter gas is cooled to 180° C. and then absorbed by benzene sulphonic acid, absorption and disulphonation proceed simultaneously.

It is a feature of our invention that the continuous sulphonation of benzene or benzene sulphonic acid can be carried out successfully.

Where it is desired to produce benzene monosulphonic acid and particularly where the benzene sulphonic acid employed as solvent is circulated in an absorption system for dissolving sulphur trioxide, its temperature should, as already mentioned, be kept at a low figure consistent with maintaining the liquid phase.

It has been found that the melting point of benzene sulphonic acid can be lowered by the inclusion of sodium and/or potassium benzene sulphonate, the melting point falling with increasing amounts of one or both the salts from 61° C. to a minimum of about 48° C. at a salt concentration of 10% by weight. With further additions of one or both salts the melting point rises rapidly so that the maximum amount of alkali metal benzene sulphonate to be incorporated is 13%.

It is a further feature of the invention that, in the production of benzene monosulphonic acid, up to 13% of an alkali metal benzene sulphonate is maintained in solution and where a circulating system is employed, a concentration in that range is maintained by continuous addition of alkali metal benzene sulphonate. In this way it is possible to absorb sulphur trioxide at as low a temperature as 48° C. and in consequence the formation of benzene disulphonic acid is considerably reduced.

If the benzene sulphonic acid is to be used for phenol manufacture the presence of the alkali metal salts of the acid is not disadvantageous since all the acid is normally converted to the sodium and/or potassium salt prior to fusion.

The following examples illustrate the manner in which the invention may be put into effect.

*Example I*

36 grams of dry sodium benzene sulphonate were dissolved in 316 grams of benzene sulphonic acid and the mixture was circulated at a rate of 900 grams per hour down an absorption column 2′ 6″ long, one inch and a quarter diameter packed with quarter inch glass rings. Up the column there was passed a gaseous mixture of 7% by volume of sulphur trioxide and 93% of air at a combined rate of 30 litres per hour. The column temperature was maintained at 55° C. The gas was almost completely devoid of sulphur trioxide after passing up the column. When 10 grams of sulphur trioxide had been absorbed by the benzene sulphonic acid, 9.8 grams of benzene were gradually added. The temperature of the acid was maintained at 55° C. by external cooling. After 10 minutes the acid was analysed and found to contain 335.8 grams of benzene sulphonic acid and 36 grams of sodium benzene sulphonate.

*Example II*

A solution of 36 parts by weight of sodium benzene sulphonate in 284 parts of benzene sulphonic acid was circulated down the absorption column through which was passed a gaseous mixture of 7% by volume of sulphur trioxide and 93% of air. The initial temperature of the benzene sulphonic acid passing down the column was 55° C. but this was gradually allowed to rise to 100° C. in order to diminish the viscosity which increased as the sulphur trioxide content of the mixture increased.

When 160 parts of sulphur trioxide had been absorbed, the acid was withdrawn from the column and heated to 180° C. for 2 hours. The acid was then converted to the sodium salt by neutralisation with sodium hydroxide and the salt fused with 960 parts of sodium hydroxide at 320° for 1 hour. By neutralisation of the fusion mass, followed by ether extraction 165 parts by weight of resorcinol were isolated.

We claim:

1. A process of producing benzene sulphonic acid which comprises selectively dissolving gaseous sulphur trioxide from admixture with diluent gases in liquid benzene sulphonic acid, and sulphonating benzene with the dissolved sulphur trioxide at a temperature below that at which substantial sulphonation of the benzene sulphonic acid takes place.

2. A process as set forth in claim 1, in which the sulphonation is carried out at a temperature not exceeding 80° C.

3. A process as set forth in claim 1, in which up to 13% of an alkali metal benzene sulphonate is added to the benzene sulphonic acid solvent, to depress its melting point.

4. A process as set forth in claim 1, in which a stoichiometrical excess of benzene is added to the sulphur trioxide solution, to form benzene sulphonic acid, after which the residual, excess benzene is converted to benzene sulphonic acid by the addition of a stoichiometric proportion of sulphur trioxide.

5. A process for the production of benzene sulphonic acid which comprises continuously scrubbing sulphur trioxide from gases resulting from the combustion of sulphur, with liquid benzene sulphonic acid at a temperature below about 100° C., continuously feeding benzene to the resulting scrubbing liquor, containing dissolved sulphur trioxide, and maintaining the resulting mixture at a temperature below 100° C. to permit formation of benzene sulphonic acid from the dissolved benzene and sulphur trioxide.

6. A process for the production of benzene disulphonic acid which comprises continuously scrubbing sulphur trioxide from gases resulting from the combustion of sulphur, with liquid benzene sulphonic acid, and heating the solution of sulphur trioxide in the benzene sulphonic acid by the combustion heat contained in the gases, to cause the continuous formation of benzene disulphonic acid.

7. A process for the production of benzene disulphonic acid in which gaseous sulphur trioxide is selectively absorbed from admixture with diluent gases by liquid benzene monosulphonic acid and the resulting solution is heated to a temperature at which the liquid benzene monosulphonic acid is sulphonated by sulphur trioxide.

References Cited in the file of this patent

UNITED STATES PATENTS

| | | |
|---|---|---|
| 1,233,627 | Weber | July 17, 1917 |
| 1,260,852 | Aylsworth | Mar. 26, 1918 |
| 1,608,006 | Shapleigh | Nov. 23, 1926 |
| 2,240,935 | Lepin | May 6, 1941 |
| 2,448,184 | Lemmon | Aug. 31, 1948 |
| 2,523,582 | Mattson | Sept. 26, 1950 |
| 2,573,675 | Bloch et al. | Nov. 6, 1951 |
| 2,616,936 | Mannen et al. | Nov. 4, 1952 |
| 2,693,479 | Ross | Nov. 2, 1954 |
| 2,693,487 | Swisher | Nov. 2, 1954 |